(12) United States Patent
Karaki et al.

(10) Patent No.: US 7,953,189 B2
(45) Date of Patent: May 31, 2011

(54) RECEIVER AND RECEIVING METHOD

(75) Inventors: Isuke Karaki, Yokohama (JP); Makoto Inoguchi, Nishitokyo (JP)

(73) Assignee: Seiko Epson Corporation (JP)

( * ) Notice: Subject to any disclaimer, the term of this patent is extended or adjusted under 35 U.S.C. 154(b) by 624 days.

(21) Appl. No.: 12/043,436

(22) Filed: Mar. 6, 2008

(65) Prior Publication Data
US 2008/0317174 A1    Dec. 25, 2008

(30) Foreign Application Priority Data

Mar. 9, 2007   (JP) .................................. 2007-059580
Jan. 11, 2008  (JP) .................................. 2008-004033

(51) Int. Cl.
*H04L 7/04* (2006.01)
*H04L 7/06* (2006.01)

(52) U.S. Cl. ........................................ 375/343; 375/364

(58) Field of Classification Search .................. 375/316, 375/343, 340, 354, 362, 365–368, 237; 370/503, 370/509–515
See application file for complete search history.

(56) References Cited

U.S. PATENT DOCUMENTS

| | | | | |
|---|---|---|---|---|
| 2003/0147480 A1* | 8/2003 | Richards et al. | ............. | 375/343 |
| 2003/0201932 A1* | 10/2003 | Rabinowitz et al. | ..... | 342/357.09 |
| 2005/0175125 A1* | 8/2005 | Krivokapic | .................... | 375/340 |
| 2009/0074117 A1* | 3/2009 | Fujita et al. | .................... | 375/343 |
| 2009/0110128 A1* | 4/2009 | Yu et al. | ......................... | 375/354 |

FOREIGN PATENT DOCUMENTS

| | | |
|---|---|---|
| JP | 10-508725 | 8/1998 |
| JP | 2004-241927 | 8/2004 |
| JP | 2004-336764 | 11/2004 |
| JP | 2005-039392 | 2/2005 |
| JP | 2005-277642 | 10/2005 |
| JP | 2006-229828 | 8/2006 |
| JP | 2006-311511 | 11/2006 |
| JP | 2006-352412 | 12/2006 |
| JP | 2007-235936 | 9/2007 |

* cited by examiner

*Primary Examiner* — Tesfaldet Bocure
(74) *Attorney, Agent, or Firm* — Harness, Dickey & Pierce, P.L.C.

(57) ABSTRACT

When a correlation judging circuit judges that the correlation degree between r pulses in a reception signal and a generated substantially the same template as the r pulses is small, a pulse number adjusting circuit outputs a pulse number signal representing s pulses in place of the r pulses, and a template generating circuit generates the substantially the same template as the s pulses, whereby the correlation judging circuit judges the correlation degree between the r pulses in the reception signal and the generated substantially the same template as the s pulses. Accordingly, even when a confronted transmitter changes the number of pulses contained in a reception signal, synchronization capture of the reception signal can be established.

4 Claims, 12 Drawing Sheets

FIG. 2C
Sco = "CORRELATION BETWEEN RECEPTION SIGNAL Sr AND TEMPLATE Stp IS EXTREMELY WEAK"
Sco = "CORRELATION BETWEEN RECEPTION SIGNAL Sr AND TEMPLATE Stp IS WEAK"
Sco = "CORRELATION BETWEEN RECEPTION SIGNAL Sr AND TEMPLATE Stp IS SLIGHTLY WEAK"
Sco = "CORRELATION BETWEEN RECEPTION SIGNAL Sr AND TEMPLATE Stp IS SLIGHTLY STRONG"
Sco = "CORRELATION BETWEEN RECEPTION SIGNAL Sr AND TEMPLATE Stp IS STRONG", OR
Sco = "CORRELATION BETWEEN RECEPTION SIGNAL Sr AND TEMPLATE Stp IS EXTREMELY STRONG"

FIG. 2D
Sdt = "NO RECEPTION SIGNAL Sr IS RECEIVED", OR
Sdt = "RECEPTION OF RECEPTION SIGNAL Sr IS STARTED"

FIG. 2E  Snu = 1, 2, 3, · · ·

RECEIVER AND RECEIVING METHOD

BACKGROUND

1. Technical Field

This invention relates to a receiver and a receiving method.

2. Related Art

In connection with a communication device using a pulse train (described in JP-T-10-508725), a communication device for suppressing interference to another transmission/reception system (described in JP-A-2004-336764) and a communication device for generating a template (pulse train) for synchronization capture (described in JP-A-2004-241927), a transmitter located so as to confront a related-art receiver transmits to the receiver a reception signal containing a fixed number (for example 5) of pulses used for synchronization capture and information which is superposed on the pulses concerned and is to be received by the receiver. Therefore, the receiver performs the synchronization capture by using a template having the same shape as the waveforms of the five pulses.

In the transmitter, the number of pulses may be changed in accordance with the environment under which the transmitter is disposed. For example, when the propagation path between the transmitter and the receiver is not excellent, the number of pulses is increased so that the receiver can surely perform the synchronization capture, and for example, the number of pulses is increased to ten. In other words, when the power of a signal transmitted by another transmitter is faint, in order to avoid the signal transmitted by the transmitter from adversely affecting, that is, interfering in the faint signal transmitted by the other transmitter, the number of pulses is reduced, for example, it is reduced to three.

However, the receiver described above has only the template having the same waveforms as the five pulses, and does not have any other template, and thus there is a problem that when the transmitter transmits a signal containing ten pulses described above or a signal containing three pulses described above, it is impossible to perform synchronization capture on the signal concerned.

SUMMARY

A receiver according to a first aspect of the invention includes:

a reception signal detecting circuit that detects whether reception of a reception signal in which data to be received is superposed on pulses of q (q represents an integer from 1 to p) out of pulses from 1 to p (p represents any integer of 2 or more) is started;

a pulse number adjusting circuit that outputs a pulse number signal representing "r" (r pulses) (r represents an integer from 1 to p) out of the pulses from 1 to p when the reception signal detecting circuit starts the reception of the reception signal;

a template generating circuit that generates substantially the same template as the r pulses represented by the pulse number signal out of the templates from the template having substantially the same waveform as the one pulse to the template having the same waveform as the p pulses when an input of the pulse number signal is received; and a correlation judging circuit that judges the correlation degree between the q pulses in the reception signal and the generated substantially same template as the r pulses, wherein the correlation judging circuit recognizes that the synchronization of the reception signal has been enabled to be captured when it is judged that the correlation degree is large, and when the correlation judging circuit judges that the correlation degree is small, the pulse number adjusting circuit outputs a pulse number signal representing "s" (s pulses) (s represents an integer from 1 to p) out of the pulses from 1 top in place of the r pulses, and the template generating circuit generates substantially the same template as the s pulses.

According to the receiver of the first aspect, when the correlation judging circuit judges that the correlation degree between the r pulses in the reception signal and the generated substantially same template as the r pulses is small, the pulse number adjusting circuit outputs the pulse number signal representing the s pulses in place of the r pulses, and the template generating circuit generates the substantially same template as the s pulses, whereby the correlation judging circuit judges the correlation degree between the r pulses in the reception signal and the generated substantially same template as the s pulses. Accordingly, even when a confronted transmitter changes the number of pulses contained in the reception signal, synchronization capture of the reception signal can be established.

According to a receiver of a second aspect, in the receiver of the first aspect, the correlation judging circuit further contains a storage circuit that stores the s pulses when it is judged that the correlation degree between the q pulses in the reception signal and the s pulses in the generated template, and when the reception signal detecting circuit judges that reception of a different reception signal is started after the reception signal, the pulse number adjusting circuit outputs a pulse number signal representing "s" (s pulses) stored in the storage circuit in place of the output of the pulse number signal representing the r pulses.

According to the receiver of the second aspect, the storage circuit stores the s pulses when the correlation judging circuit judges that the correlation degree between the q pulses in the reception signal and the s pulses in the generated template is large, that is, when it is judged that synchronization capture is established, and when the reception signal detecting circuit judges that the reception of the other reception signal is started, the pulse number adjusting circuit outputs the pulse number signal representing "s" (s pulses), whereby the correlation judging circuit starts the judgment of the correlation by using substantially the same template as the s pulses. Therefore, a time required to complete the synchronization capture can be shortened as compared with a case where the judgment of the correlation is started by using substantially the same template as the r pulses.

According to a receiver of a third aspect, in the receiver of the first aspect, the pulses are based on a UWB (Ultra Wide Band) communication system.

A receiving method of a fourth aspect of the invention includes:

a reception signal detecting step that detects whether reception of a reception signal in which data to be received is superposed on pulses of q (q represents an integer from 1 to p) out of pulses from 1 to p (p represents any integer of 2 or more) is started;

a pulse number adjusting step that outputs a pulse number signal representing "r" (r pulses) (r represents an integer from 1 to p) out of the pulses from 1 to p when the reception signal detecting step starts the reception of the reception signal;

a template generating step that generates substantially the same template as the r pulses represented by the pulse number signal out of the templates from the template having substantially the same waveform as the one pulse to the template having the same waveform as the p pulses when an input of the pulse number signal is received; and a correlation judging step that judges the correlation degree between the q pulses in the reception signal and the generated substantially same template as the r pulses, wherein the correlation judging step recognizes that the synchronization of the reception signal has been enabled to be captured when it is judged that the correlation degree is large, and when the correlation judging step judges that the correlation degree is small, the pulse number adjusting step outputs a pulse number signal representing "s" (s pulses) (s represents an integer from 1 to p) out of the pulses from 1 to p in place of the r pulses, and the template generating step generates substantially the same template as the s pulses.

A receiver according to a fifth aspect of the invention includes a template generating circuit for generating substantially the same template as r (r represents an integer from 1 to p) pulses from 1 to p (p represents any integer of two or more), and a correlation judging circuit for recognizes that synchronization of a reception signal has been enabled to be captured when it is judged that the correlation degree between q (q represents an integer from 1 to p) pulses in the reception signal and substantially the same template as the r pulses is large.

According to a receiver of a sixth aspect, in the receiver of the fifth aspect, when the correlation judging circuit judges that the correlation degree is small, the template generating circuit generates substantially the same template as s pulses in place of the r pulses.

A receiving method according to a seventh aspect of the invention includes a template generating step that generates substantially the same template as r (r represents an integer from 1 to p) pulses from 1 to p (p represents any integer of two or more), and a correlation judging step that recognizes that synchronization of a reception signal has been enabled to be captured when it is judged that the correlation degree between q (q represents an integer from 1 to p) pulses in the reception signal and substantially the same template as the r pulses is large.

According to a receiving method of an eighth aspect of the invention, in the receiving method of the seventh aspect, when the correlation judging step judges that the correlation degree is small, the template generating step generates substantially the same template as s pulses in place of the r pulses.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
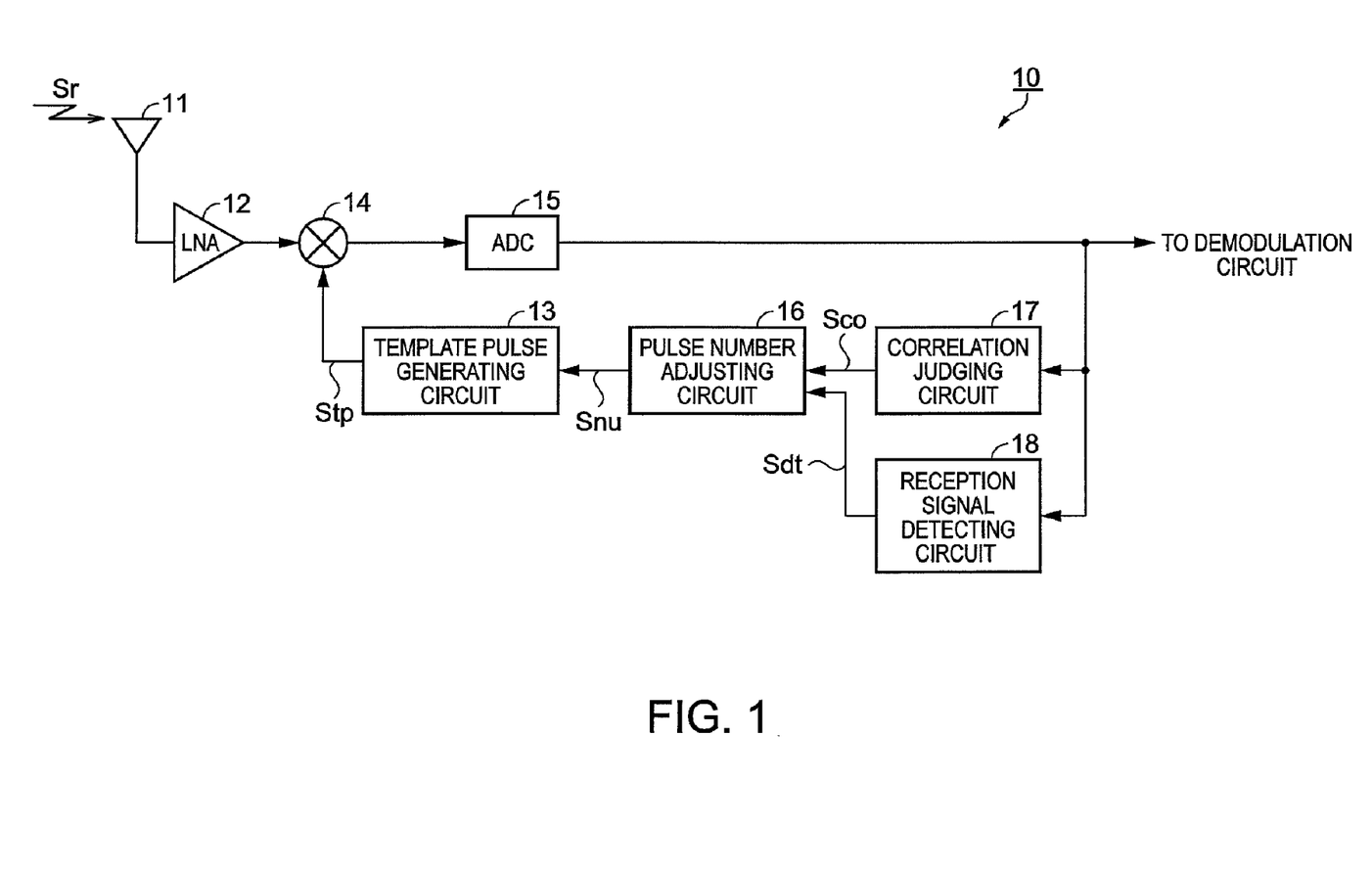
FIG. 1 is a diagram showing the construction of a receiver according to an embodiment of the invention.

FIG. 1 shows the construction of a receiver according to an embodiment of the invention. The receiver 10 according to this embodiment is implemented in the form of an IC chip (semiconductor device), for example. The receiver 10 is located at the front stage of a demodulator (not shown), and it contains an antenna 11, a low noise amplifier (LNA) 12, a template pulse generating circuit 13, a multiplier 14, an AD converter (ADC) 15, a pulse number adjusting circuit 16, a correlation judging circuit 17 and a reception signal detecting circuit 18 as shown in FIG. 1.

Figure 2A:
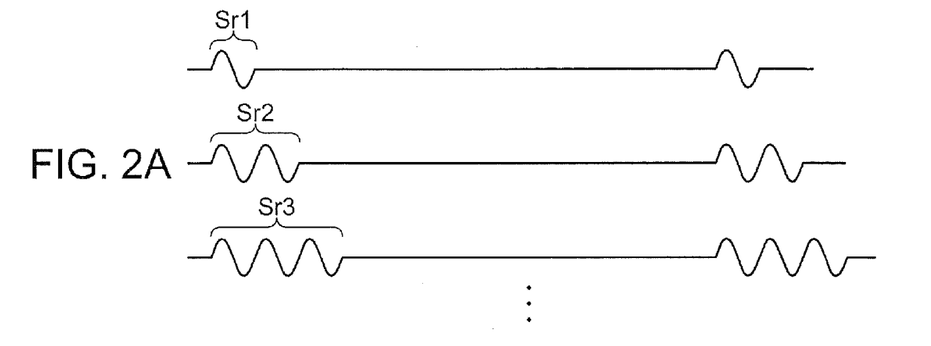
FIGS. 2A to 2E are diagrams showing each signal in the receiver according to the embodiment of the invention.

The antenna 11 receives a signal (reception signal) Sr which is transmitted from a confronted transmitter (not shown) and on which information to be received is superposed. For example, it receives a reception signal Sr1 containing one pulse, a reception signal Sr2 containing two pulses and a reception signal Sr3 containing three pulses as shown in FIG. 2A.

LNA 12 amplifies the received reception signal Sr.

Figure 2B:
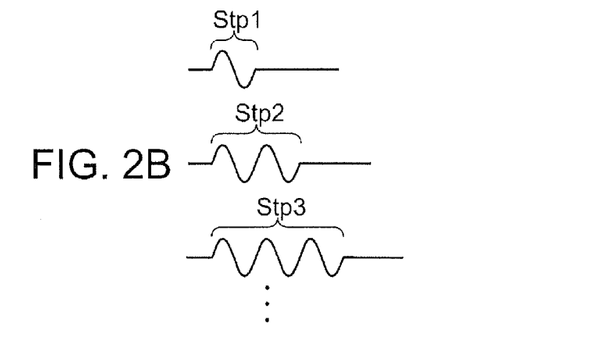

The multiplier 14 multiplies the reception signal Sr with a template Stp generated by the template pulse generating circuit 12 (for example, a template Stp1 having substantially the same shape of one pulse, a template Stp2 having substantially the same shape as two pulses, a template Stp3 having substantially the same shape as three pulses shown in FIG. 2B).

The AD converter 15 converts the multiplied reception signal Sr from an analog style to a digital style.

Figure 2C:
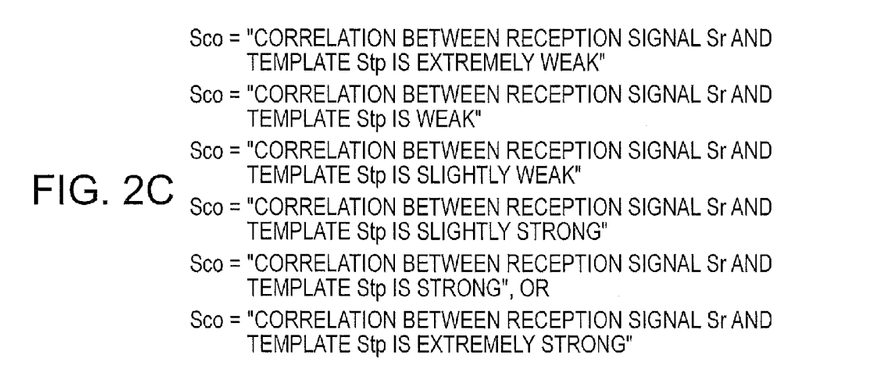

The correlation judging circuit 17 is a so-called correlator, and it judges the correlation degree between the reception signal Sr and the template Stp and outputs a correlation signal Sco representing the correlation degree. As shown in FIG. 2C, the correlation signal Sco represents "the correlation between the reception signal Sr and the template Stp is strong (i.e., the correlation degree is large)", "the correlation between the reception signal Sr and the template Stp is weak (the correlation degree is small)", etc.

Figure 2D:
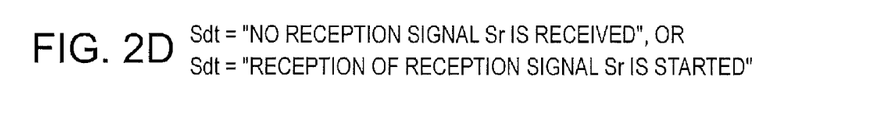

For example, on the basis of the presence or absence of a rising edge or falling edge representing existence of the reception signal Sr, the reception signal detecting circuit 18 detects whether the reception of the reception signal Sr is started or not, and outputs a detection signal Sdt representing detection or non-detection. The detection signal Sdt concerned represents, for example, "the reception signal Sr is not received", "the reception of the reception signal Sr is started" as shown in FIG. 2D.

Figure 2E:
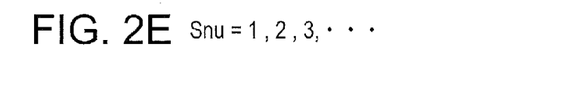

According to the correlation signal Sco output from the correlation judging circuit 17, the pulse number adjusting circuit 16 outputs to the template pulse generating circuit 13 a pulse number signal Snu representing the number of pulses (for example, one, two, three) to be contained in the template Stp generated by the template pulse generating circuit 13 as shown in FIG. 2E.

More specifically, when receiving the detection signal Sdt, the pulse number adjusting circuit 16 outputs a pulse number signal Snu representing a predetermined number, that is, an initial number (for example, one).

When the correlation signal Sco represents "the correlation degree is small", the pulse number adjusting circuit 16 changes the number to be represented by the pulse number signal Snu, and outputs the pulse number signal Snu representing "two" (two pulses) in place of the pulse number signal Snu representing "one" (one pulses) or outputs the pulse number signal Snu representing "one" (one pulse) in place of the pulse number signal Snu representing "three" (three pulses).

According to the pulse number signal Snu output from the pulse number adjusting circuit 16, the template pulse generating circuit 13 generates a template containing pulses whose number is represented by the pulse number signal Snu concerned, for example, the templates Stp1, Stp2, Stp3 described above (shown in FIG. 2B).

According to the receiver 10 of this embodiment of the invention, when it is judged that the correlation between the reception signal Sr and the template Stp (for example, the template Stp1) is small, the correlation judging circuit 17 outputs a pulse number signal Snu representing a number (for example, 2) different from the present number (for example, one), and the template pulse generating circuit 13 generates a template Stp2 which is represented by the pulse number signal Snu and contains pulses whose number has been changed (for example, to two). Therefore, unlike the related art, even the confronting transmitter transmits signals Sr containing various numbers of pulses, the synchronization capture of the signals Sr concerned can be surely performed.

Figure 3A:
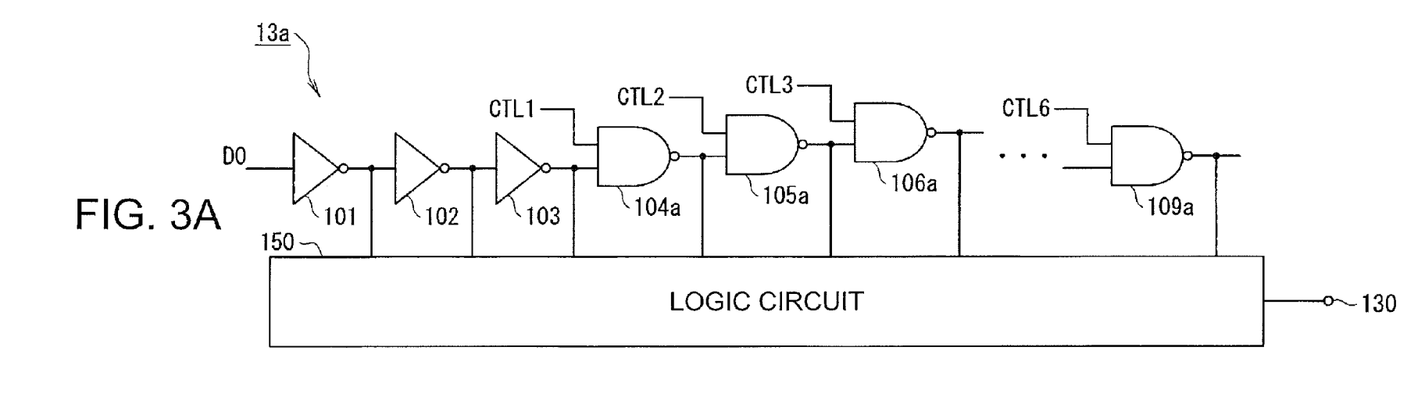
FIGS. 3A and 3B are circuit diagrams showing a specific construction of a template pulse generating circuit in the receiver of FIG. 1.
Figure 3B:
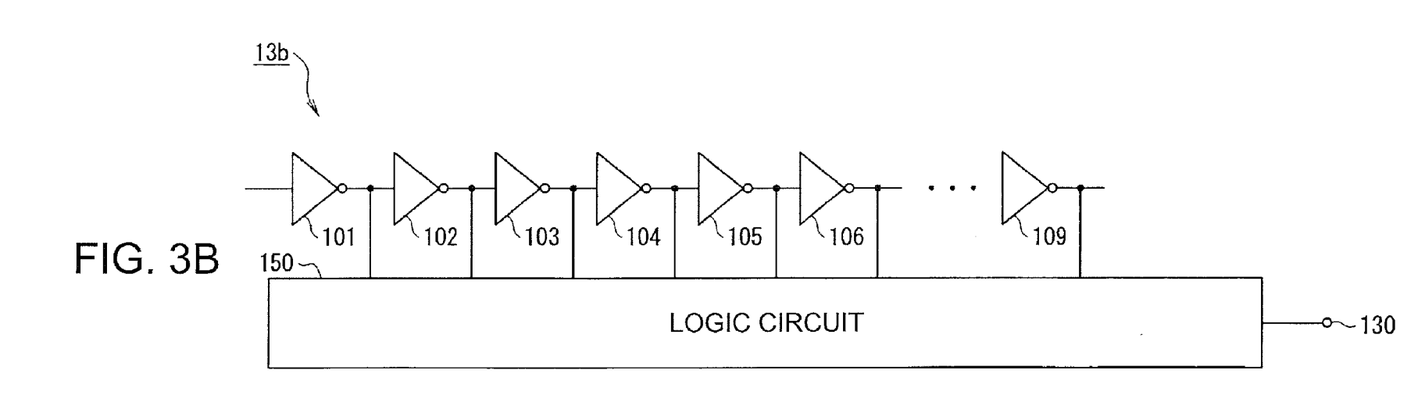

FIGS. 3A and 3B are circuit diagrams showing a specific construction of the template pulse generating circuit 13 in the receiver 10 of FIG. 1. FIG. 3A shows a template pulse generating circuit 13*a* applied to the receiver of this invention, and FIG. 3B is a diagram which is used as a reference to explain the circuit of FIG. 3A and shows a pulse generating circuit 13*b* as a prototype of the template pulse generating circuit 13*a* of FIG. 3A.

For convenience of description, the pulse generating circuit 13*b* of FIG. 3B as the prototype of the template pulse generating circuit 13*a* of FIG. 3A will be first described.

Figure 4:
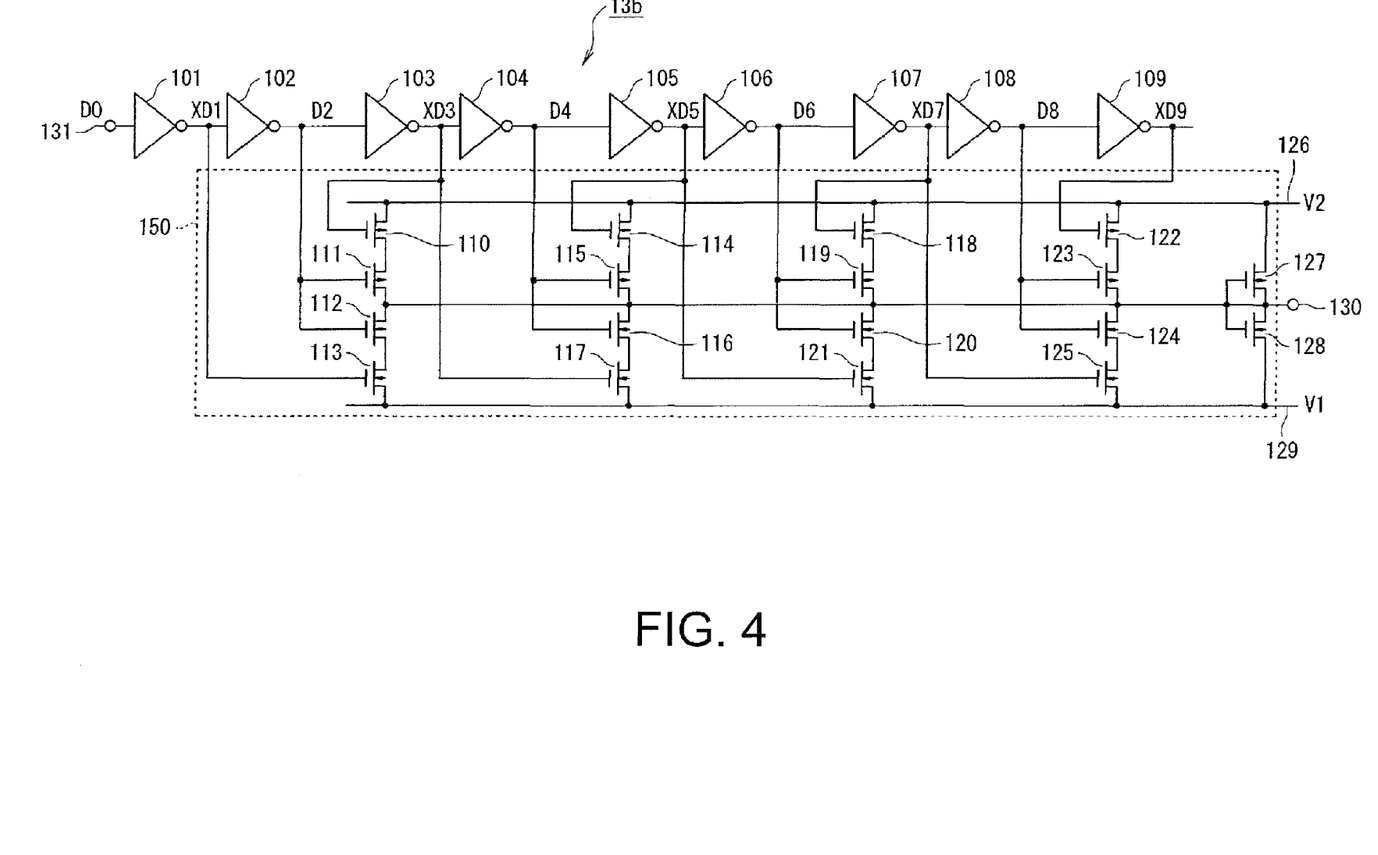
FIG. 4 is a circuit diagram showing a pulse generating circuit which contains a detailed diagram of a logic circuit in FIGS. 3A and 3B.

The outputs of inverters 101 to 109 at plural stages (nine stages in an example of FIG. 4) are input to a logic circuit 150 described later as shown in FIG. 4, and a pulse signal which repetitively appears every predetermined period is output from the logic circuit 150.

Figure 5:
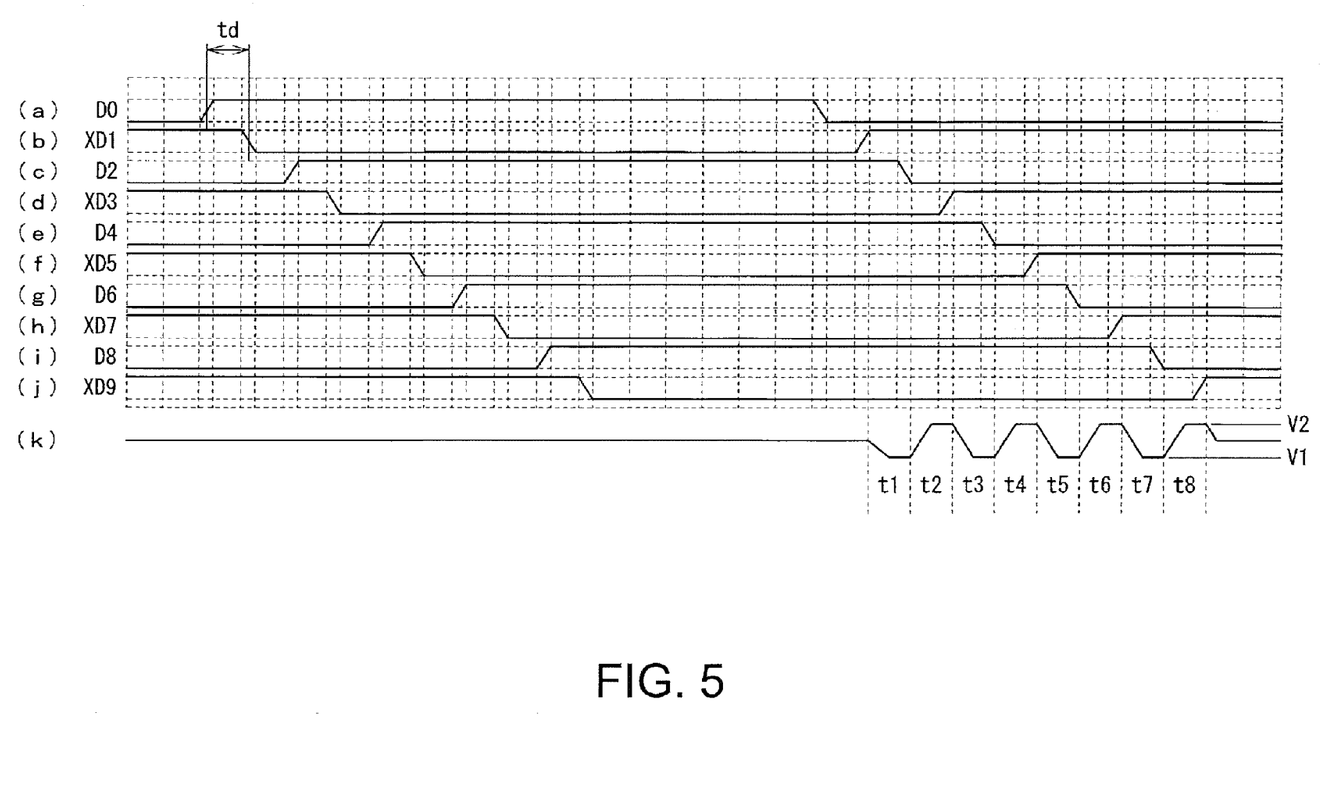
FIG. 5 is a signal waveform diagram of each part in the pulse generating circuit of FIG. 4.

FIG. 4 is a circuit diagram showing the pulse generating circuit 13*b* which contains a detailed diagram of the logic circuit 150 in FIG. 3B. FIG. 5 is a signal waveform diagram of each part in the pulse generating circuit 13*b* of FIG. 4.

In FIG. 4, a delay circuit is constructed by cascade-connecting the inverters 101 to 109 of nine stages. A base band clock Do input to the terminal 131 propagates in the delay circuit while it is delayed every time td at each stage as shown in (b) to (k) of FIG. 5 and also the logic thereof is inverted, and then output from each stage.

That is, if the signal applied to the input terminal 131 is set to positive logic, the following value is output at an i-th stage when k represents a natural value and the negative logic of the signal is represented by disposing "X" before the name of the signal:

For i=2k−1, XD2k−1
For i=2k, D2k

Each of N-channel MOS transistors 113 and 112 is conducted to connect a pulse output terminal 130 to a first potential level V1 when the output XD1 at the first stage of the delay circuit and the output D2 of the second stage are high.

Subsequently, each of P-channel MOS transistors 110 and 111 is conducted to connect the pulse output terminal 130 to a second potential level V2 when the output D2 of the second stage of the delay circuit and the output XD3 of the third stage of the delay circuit are low (that is, both the negative logic of D2 and D3 are high (the logical product is true)).

Likewise, each of N-channel MOS transistors 116, 117, 120, 121, 124 and 125 is conducted to connect the pulse output terminal 130 to the first potential level V1 when the output XD2k−1 of the (2k−1)-th stage of the delay circuit and the output D2k of the 2k-th stage of the delay circuit are high, that is, the logical product between XD2k−1 and D2k is true.

Subsequently, when the output D2k of the 2k-th stage of the delay circuit and the output XD2k+1 of the (2k+1)-th stage of the delay circuit are low, that is, the logical product between XD2k corresponding to negative D2k and D2k+1 corresponding to negative XD2k+1 is true, each of P-channel MOS transistors 114, 115, 118, 119, 122 and 123 is conducted to connect the pulse output terminal 130 to the second potential level V2.

Through the above operation, the pulse waveform as shown in (k) of FIG. 5 can be generated.

The pulse generating circuit 13*b* of FIG. 3B which is shown in detail in FIG. 4 is constructed and operated as described above. However, the template pulse generating circuit 13*a* of FIG. 3A which is applied to the receiver of the embodiment of the invention is constructed by replacing the inverters 104 to 109 out of the cascade-connected circuit portion based on the inverters 101 to 109 in the circuit construction of the pulse generating circuit 13*b* of FIG. 3B by NAND circuits 104*a* to 109*a*.

As shown in FIG. 3A, the inverters 104 to 109 are replaced by the NAND circuits 104*a* to 109*a* so as to establish the relationship that the respective one input terminals of the NAND circuits 104*a* to 109*a* correspond to the respective input terminals of the inverters 104 to 109 and the respective output terminals thereof correspond to the respective output terminals of the inverters 104 to 109, and also pulse number adjusting signals CTL1, CTL2, CTL3, . . . , CTL6 are supplied to the other ends of the NAND circuits 104*a*, 105*a*, 106*a*, . . . , 109*a*, respectively.

In accordance with supply or non-supply of these pulse number adjusting signals CTL1 to CTL6 (in accordance with whether the pulse signal level is high (H) or low (L)), it is selected whether the corresponding NAND circuits 104*a* to 109*a* function as inverters. As a result, the wave number (pulse number) of carrier waves in the pulse at each time every predetermined period as shown in (k) of FIG. 5 is selected.

From the viewpoint of reduction of power consumption and miniaturization of the receiver based on the reduction of the power consumption, UWB communication is preferably used as the pulse communication.

Figure 6:
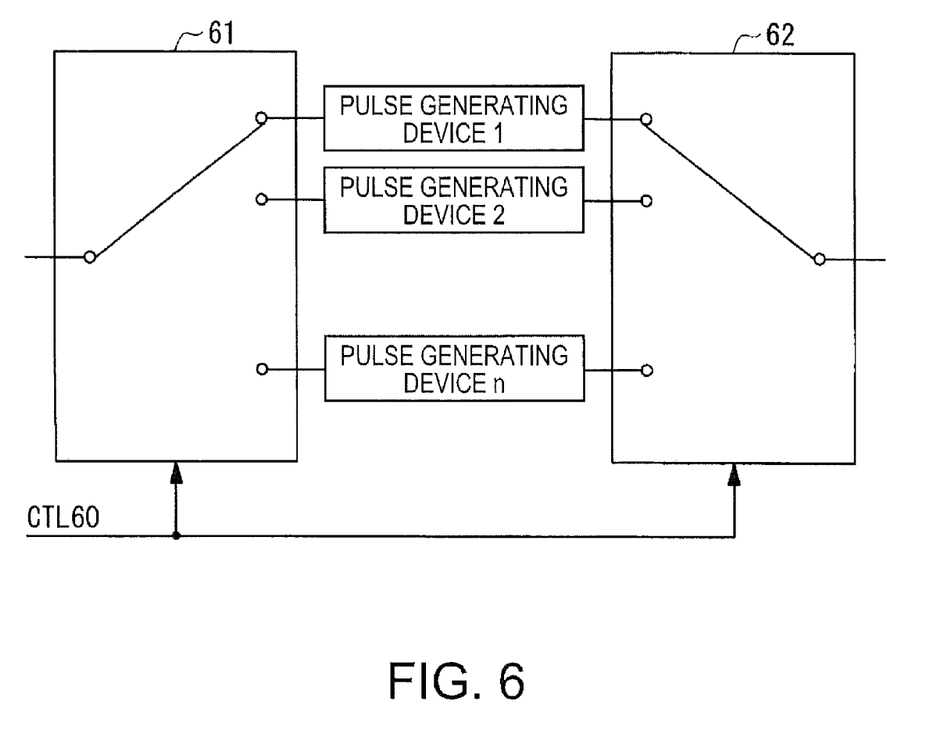
FIG. 6 is a diagram showing another embodiment of the template pulse generating circuit applied to the receiver of this invention.

FIG. 6 is a diagram showing another embodiment of the template pulse generating circuit applied to the receiver of this invention.

In the template pulse generating circuit of FIG. 6, any one of plural pulse generating devices 1 to n which are pulse generating devices as shown in FIG. 1B and are different from one another in the number of cascade-connection stages of the inverters is made to selectively effectively function by a pulse supply switching switch 61 and an output pulse switching switch 62 whose input and output are selectively switched in response to the pulse number adjusting signal CTL 60, whereby the pulse width of the output signal is selectively switched.

That is, each of the pulse generating devices 1 to n continuously generates a template pulse having a fixed frequency over each different unit duration corresponding to the number of stages of the cascade-connection of the inverters, and some of these pulse generating devices functions selectively.

Figure 7:
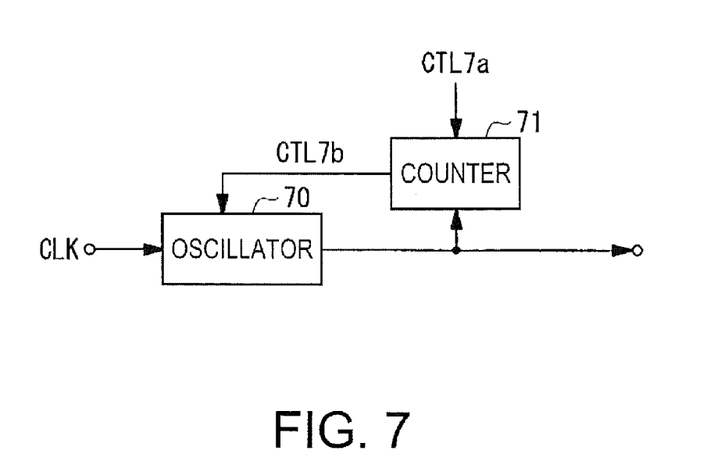
FIG. 7 is a diagram showing another embodiment of the template pulse generating circuit applied to the receiver of the invention.

FIG. 7 is a diagram showing another embodiment of the template pulse generating circuit applied to the receiver of the invention. A counter 71 is provided at the output side of an oscillator 70 which oscillates at a fixed frequency in accordance with a clock pulse CLK, for example, a programmable counter in which an upper limit count value (a count value just before it is reset) can be selectively set by a set signal CTL 7a is applied as the counter 71, and the oscillation operation of the oscillator 70 is stopped by a count-up output CTL 7b which reaches the set value concerned. The set signal CTL 7a described above corresponds to the pulse number adjusting signal of the template pulse generating circuit.

Figure 8:
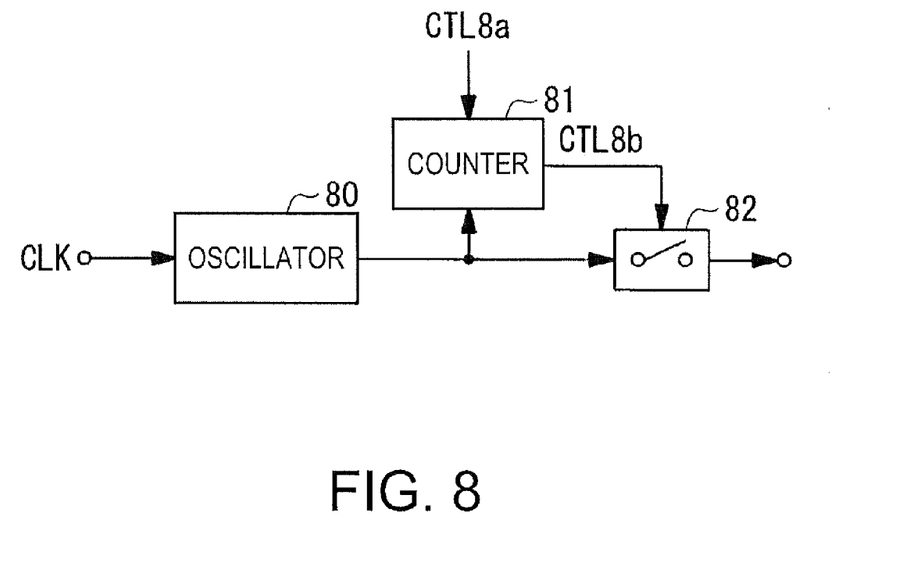
FIG. 8 is a diagram showing another embodiment of the template pulse generating circuit applied to the receiver of the invention.

FIG. 8 is a diagram showing another embodiment of the template pulse generating circuit applied to the receiver of the invention. A counter 81 is provided at the output side of an oscillator 80 which oscillates at a fixed frequency in accordance with a clock pulse CLK. For example, a programmable counter which can selectively set the upper limit value of the count (the count value just before it is reset) by a set signal CTL 8a is applied as the counter 81, and a switch 82 inserted in a passage for transmitting an output pulse train from the oscillator 80 to the outside is turned off by a count-up output CTL 8b reaching the upper limit value. The set signal CTL 8a described above corresponds to the pulse number adjusting signal of the template pulse generating circuit.

Figure 9:
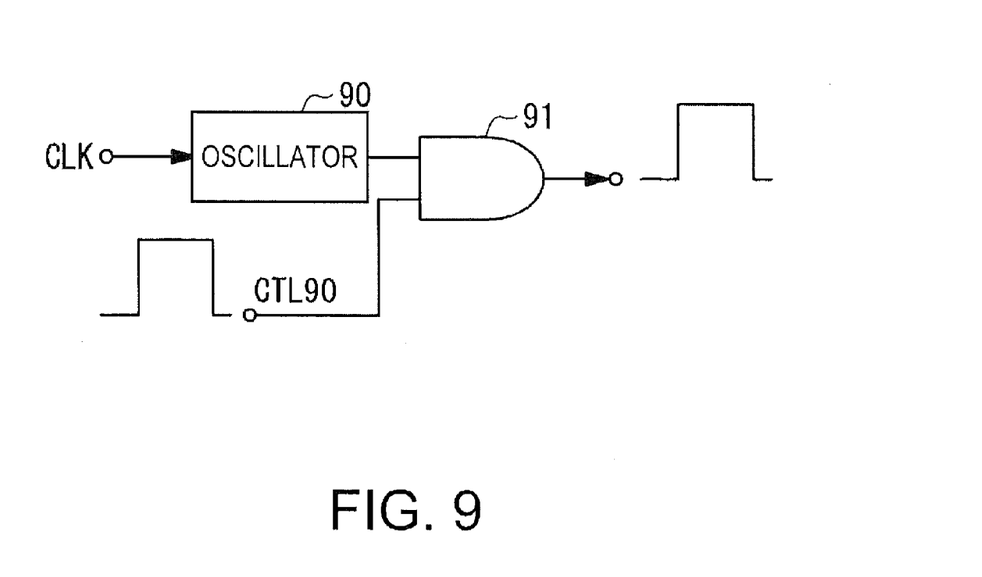
FIG. 9 is a diagram showing another embodiment of the template pulse generating circuit applied to the receiver of the invention.

FIG. 9 is a diagram showing another embodiment of the template pulse generating circuit applied to the receiver of the invention. An AND circuit 91 is provided at the output side of an oscillator 90 oscillating at a fixed frequency in accordance with a clock pulse CLK, for example, the output of the oscillator 90 is supplied to one input terminal of the AND circuit 91, and a pulse signal CTL 90 having a pulse width for defining a pulse number is supplied to the other input terminal.

The pulse signal CTL 90 corresponds to the pulse number adjusting signal, and an output pulse train from the oscillator 90 is output from the output terminal of the AND circuit 91 during the time defined by the pulse signal CTL 90.

Figure 10:
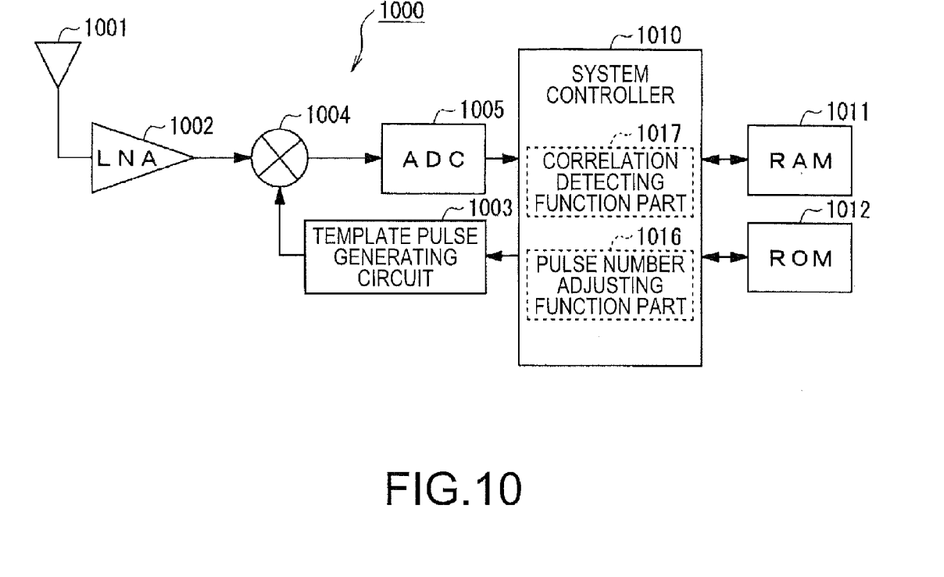
FIG. 10 is a block diagram showing a receiver as an example belonging to the embodiment of the invention.

FIG. 10 is a block diagram showing a receiver 1000 as an example belonging to the embodiment of the invention.

A pulse signal received by an antenna 1001 is amplified by a low noise amplifier (LNA) 1002. The output of the LNA 1002 and a template pulse generated in a template pulse generating circuit 1003 are multiplied with each other in a multiplier 1004 to detect the pulse signal, and the output of the multiplier 1004 is converted to a digital signal in an AD converter (ADC) 1005 and supplied to a system controller 1010 which is mainly constructed by a microprocessor for collectively managing the operation of the receiver 1000, for example.

This system controller 1010 has a pulse number adjusting function part 1016 functioning like the pulse number adjusting circuit 16 described above with reference to FIG. 1 and a correlation detecting function part 1017 for calculating a correlation value associated with the detection of the reception pulse.

The template pulse generating circuit 1003 is controlled by the pulse number adjusting function part 1016 of the system controller 1010, whereby the pulse number of the template pulse corresponding to the output of the template pulse generating circuit 1003 is adjusted, and the correlation detecting function part 1017 calculates a correlation value associated with the detection of the reception pulse in connection with each template having a pulse number as this adjustment value.

The correlation value calculated in the correlation detecting function part 1017 is stored as the record data of the corresponding relationship of the pulse number of the template pulse and the correlation value in RAM 1011 connected to the system controller 1010.

RAM 1011 connected to the system controller 1010 is used not only to hold the record data as described above, but also to hold demodulated reception data and temporarily store data under signal processing, etc.

ROM 1012 is connected to the system controller 1010, and holds information associated with a predetermined communication protocol, parameters used for calculation, etc.

In this receiver 1000, the pulse number adjusting function part 1016 sets the pulse number on the basis of the record data of the corresponding relationship between the pulse number of the template pulse and the correlation value held in RAM 1011. Therefore, an excellent reception state can be established with high probability without daringly waiting for a preliminary operation such as detection of the condition of a transmission pulse or the like when reception is started, and synchronization capture can be performed quickly in real communications, and also the power saving characteristic is also excellent.

Figure 11:
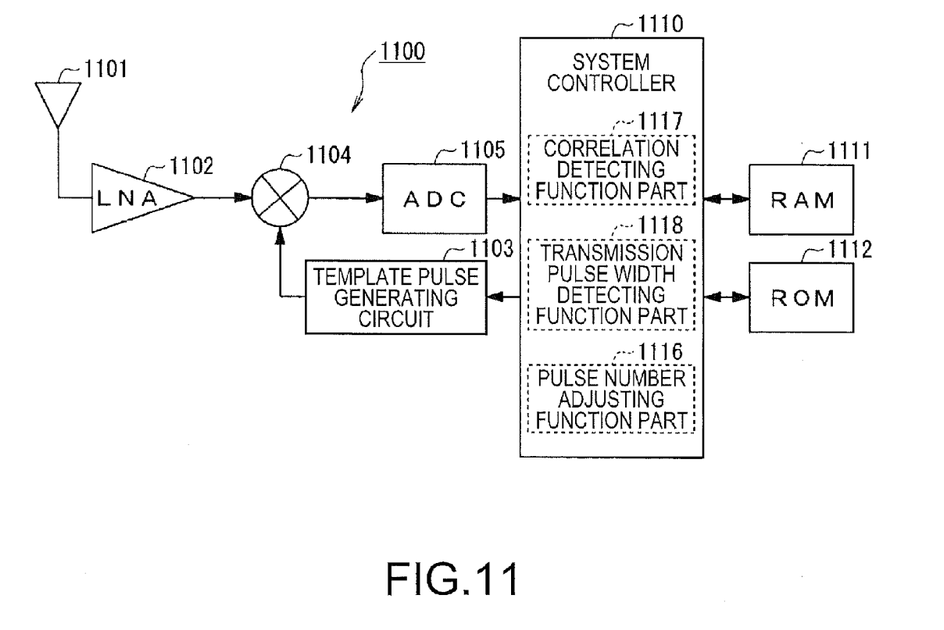
FIG. 11 is a block diagram showing a receiver as another example belonging to the embodiment of the invention.

FIG. 11 is a block diagram showing a receiver 1100 of another example belonging to the embodiment of the invention.

The receiver 1100 of FIG. 11 is different from the receiver 1000 of FIG. 10 in that it is provided with a transmission pulse width detecting unit for detecting a pulse width corresponding to a duration at each time of intermittent carrier waves of a modulated pulse signal generated in a transmission system.

The pulse signal received by the antenna 1101 is amplified by a low noise amplifier (LNA) 1102. The output of LNA 1102 is multiplied with the template pulse generated in the template pulse generating circuit 1103 in a multiplier 1104 to detect the pulse signal, and the output of the multiplier 1104 is converted to a digital signal in an AD converter (ADC) 1105. The thus-converted digital signal is supplied to a system controller 1110 which is mainly constructed by a microprocessor for collectively managing the operation of the receiver 1100, for example.

The system controller 1110 has a pulse number adjusting function part 1116 functioning like the pulse number adjusting circuit 16 described above with reference to FIG. 1, a correlation detecting function part 1117 for calculating a correlation value associated with the detection of the reception pulse, and a transmission pulse width detecting function part 1118 as a transmission pulse width detecting unit for calculating the transmission pulse width on the basis of the output data of ADC 1105.

The transmission pulse width detecting function part 1118 calculates the pulse width corresponding to the duration at each time of the intermittent carrier waves of the modulated pulse signal generated in the transmission system on the basis of the output data of ADC 1105.

The template pulse generating circuit 1103 is controlled by the pulse number adjusting function part 1116 of the system controller 1110, whereby the pulse number of the template pulse corresponding to the output of the template pulse generating circuit 1103 is adjusted. The correlation detecting function part 1117 calculates the correlation value associated with the detection of the reception pulse in connection with each template having the pulse number as this adjusted value.

RAM 1111 is connected to the system controller 1110, and it is used to hold demodulated reception data and temporarily store data under signal processing, etc.

Furthermore, ROM 1112 is connected to the system controller 1110, and holds information concerning a predetermined communication protocol, parameters used for calculation, etc.

In this receiver 1100, the pulse number adjusting function part 1116 can adaptively adjust the pulse number of the template pulse in conformity with the pulse width corresponding to the duration at each time of the intermittent carrier waves of the modulated pulse signal generated in the transmission system which is detected by the transmission pulse width detecting function part 1118, and the excellently compatible communication can be implemented between the transmission system and the reception system.

Figure 12:
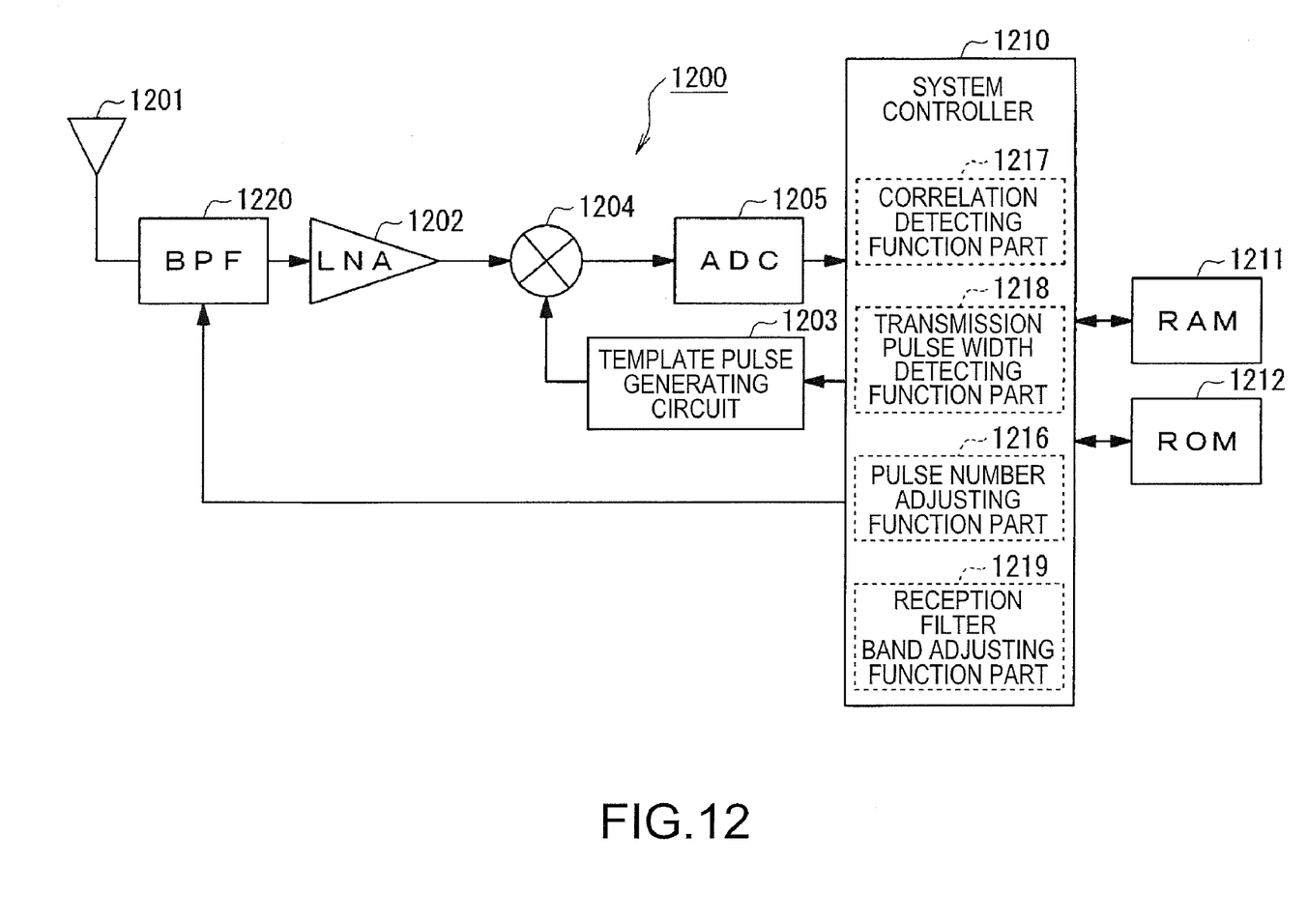
FIG. 12 is a block diagram showing a receiver as another example belonging to the embodiment of the invention.

FIG. 12 is a block diagram showing a receiver 1200 as another example belonging to the embodiment of this invention.

The receiver 1200 of FIG. 12 is different from the receiver 1000 of FIG. 10 and the receiver 1100 of FIG. 11 in that it is provided with a transmission pulse width detecting unit for detecting the pulse width corresponding to the duration at each time of the intermittent carrier waves of the modulated pulse signal generated in the transmission system and also a reception filter band adjusting unit for adjusting the pass band of the reception filter so that the pass band conforms to the detected transmission pulse width.

The pulse signal received by the antenna 1201 is passed through BPF (bandpass filter) 1220 as a reception filter to suppress noises out of a predetermined band used for communications, and then amplified by a low noise amplifier (LNA) 1202. The output of LNA 1202 is multiplied with the template pulse generated in the template pulse generating circuit 1203 by a multiplier 1204 to detect the pulse signal, and the output of the multiplier 1204 is converted to a digital signal in an AD converter (ADC) 1205 and then, for example, supplied to a system controller 1210 which is mainly constructed by a microprocessor for collectively managing the operation of the receiver 1200.

The system controller 1210 is equipped with a pulse number adjusting function part 1216 functioning like the pulse number adjusting circuit 16 described above with reference to FIG. 1, a correlation detecting function part 1217 for calculating a correlation value associated with the detection of the reception pulse and a transmission pulse width detecting function part 1218 as a transmission pulse width detecting unit for calculating a transmission pulse width on the basis of the output data of ADC 1205.

The transmission pulse width detecting function part 1218 calculates the pulse width corresponding to the duration at each time of the intermittent carrier waves of the modulated pulse signal generated in the transmission system on the basis of the output data of ADC 1205.

The template pulse generating circuit 1203 is controlled by the pulse number adjusting function part 1216 of the system controller 1210, and the pulse number of the template pulse as the output of the template pulse generating circuit 1203 is adjusted. The correlation detecting function part 1217 calculates the correlation value associated with the detection of the reception pulse in connection with each template having the pulse number as this adjusted value.

Furthermore, the system controller 1210 is equipped with a reception filter band adjusting function part 1219 as a reception filter band adjusting unit for adjusting the pass band of a band-width variable BPF 1220 so that the pass band conforms to the pulse width corresponding to the duration at each time of the intermittent carrier waves of the modulated pulse signal detected by the transmission pulse width detecting function part 1218.

The pass band of BPF 1220 is adaptively adjusted so as to conform to the pulse width described above by the reception filter band adjusting function part 1219.

RAM 1211 is connected to the system controller 1210, and used to hold demodulated reception data and temporarily store data under signal processing, etc.

Furthermore, ROM 1212 is connected to the system controller 1210 to hold information concerning a predetermined communication protocol, parameters used for calculation, etc.

In this receiver 1200, the pass band of BPF 1220 is adjusted so as to conform to the duration (transmission pulse width) at each time of the intermittent carrier waves of the modulated pulse signal by the reception filter band adjusting unit (reception filter band adjusting function part) 1219, so that excellent reception can be performed.

Figure 13:
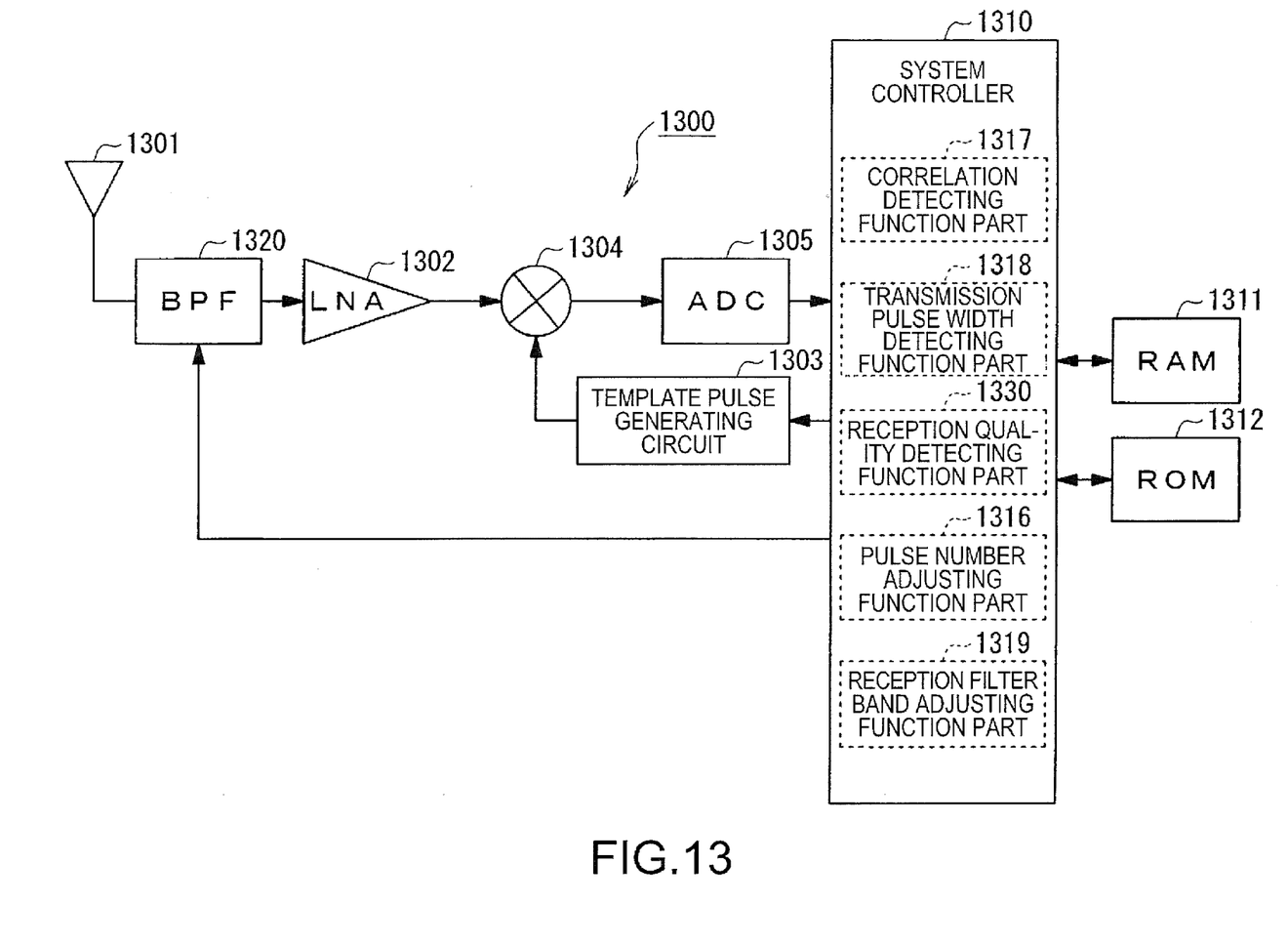
FIG. 13 is a block diagram showing a receiver as another example belonging to the embodiment of the invention.

FIG. 13 is a block diagram showing a receiver 1300 as another example belonging to the embodiment of the invention.

The receiver 1300 of FIG. 13 is different from the receiver 1200 of FIG. 12 in that the pulse number of the template pulse is adjusted in accordance with the reception quality of the reception signal.

The pulse signal received by an antenna 1301 is passed through BPF (band pass filter) 1320 as a reception filter so that noises out of a predetermined band used for communications are suppressed, and then amplified by a low noise amplifier (LNA) 1302. The output of LNA 1302 is multiplied with a template pulse generated in a template pulse generating circuit 1303 by a multiplier 1304 to detect the pulse signal, and the output of the multiplier 1304 is converted to a digital signal in an AD converter (ADC) 1305 and supplied to a system controller 1310 which is mainly constructed by a microprocessor for collectively managing the operation of this receiver 1300, for example.

This system controller 1310 is equipped with a pulse number adjusting function part 1316 functioning like the pulse number adjusting circuit 16 described above with reference to FIG. 1, a correlation detecting function part 1317 for calculating a correlation value associated with the detection of the reception pulse, and a transmission pulse width detecting function part 1318 as a transmission pulse width detecting unit for calculating the transmission pulse width on the basis of the output data of ADC 1305.

The transmission pulse width detecting function part 1318 calculates the pulse width corresponding to the duration at each time of the intermittent carrier waves of the modulated pulse signal generated in the transmission system on the basis of the output data of ADC 1305.

In this receiver 1300, the system controller 1310 is further equipped with a reception quality detecting function part 1330 for detecting the reception quality of the reception signal which is represented by BER, SNR, RSSI or an out-of-band noise.

The pulse number adjusting function part 1316 generates a control signal for adjusting the pulse number in accordance with the detection value of the reception quality in cooperation with the reception quality detecting function part 1330, and forms the pulse number in the template generating circuit 1303.

As described above, the template pulse generating circuit 1303 is controlled in accordance with the detection value of the reception quality by the pulse number adjusting function part 1316, and the pulse number of the template pulse which corresponds to the output of the template pulse generating circuit 1303 is adjusted. The correlation detecting function part 1317 calculates the correlation value associated with the detection of the reception pulse in connection with each template having the pulse number as this adjusted value.

The system controller 1310 is equipped with a reception filter band adjusting function part 1319 as a reception filter band adjusting unit for adjusting the pass band of a band-width variable BPF 1320 so that the pass band conforms to the pulse width corresponding to the duration at each time of the intermittent carrier waves of the modulated pulse signal detected by the transmission pulse width detecting function part 1318.

The pass band of BPF 1320 is adaptively adjusted so as to conform to the above pulse width by the reception filter band adjusting function part 1319.

RAM 1311 is connected to the system controller 1310 and used to hold demodulated reception data and temporarily store data under signal processing, etc.

Furthermore, ROM 1312 is connected to the system controller 1310, and holds information concerning a predetermined communication protocol, parameters used for calculation, etc.

In this receiver 1300, the reception filter band adjusting unit (reception filter band adjusting function part) 1319 adjusts the pass band of BPF 1320 so that pass band conforms to the duration (transmission pulse width) at each time of the intermittent carrier waves of the modulated pulse signal, and further the pulse number of the template pulse is adjusted in accordance with the reception quality of the reception signal represented by BER, SNR, RSSI or an out-of-band noise, so that excellent reception can be performed.

Figure 14:
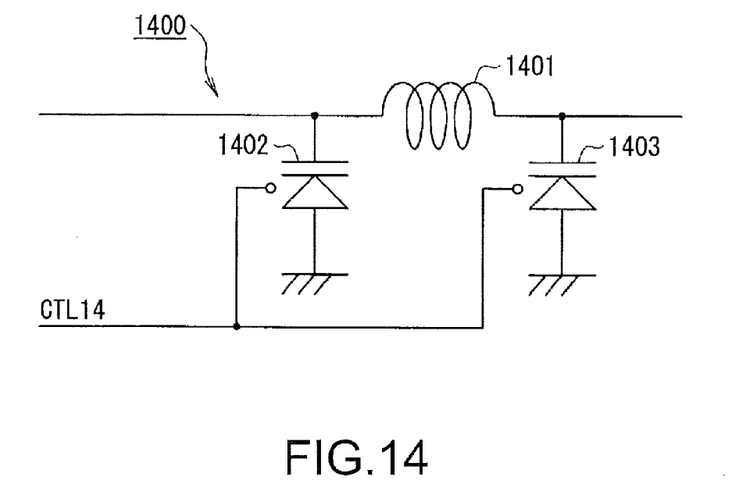
FIG. 14 is a diagram showing a construction of a bandwidth-variable reception filter in FIGS. 12 and 13.

FIG. 14 is a diagram showing a construction example of the band-width variable BPFs 1220 and 1320 in FIGS. 12 and 13. In FIG. 14, a reference numeral 1400 is newly assigned to the band-width variable filter. As shown in FIG. 14, respective one ends of varactors (variable capacity capacitors) 1402 and 1403 are connected to input and output terminals of an inductor 1401 respectively, and the band-width variable filter 1400, the other end sides of the varactors 1402 and 1403 are grounded. In addition, a control signal as a reception band control signal in FIGS. 12 and 13 is supplied to the varactors 1402 and 1403 to adjust the capacitance values thereof, whereby the pass band of the band-width variable filter 1400 is changed.

Figure 15:
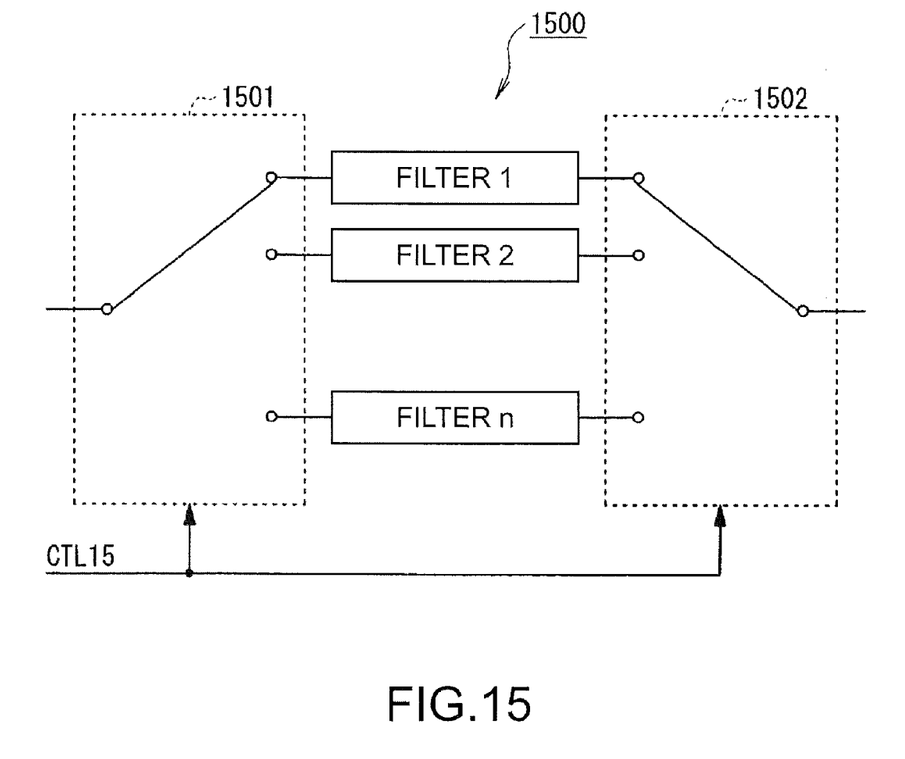
FIG. 15 is a diagram showing another construction of the bandwidth-variable reception filter in FIGS. 12 and 13.

FIG. 15 is a diagram showing another construction of the band-width variable BPFs 1220 and 1320 in FIGS. 12 and 13. In FIG. 15, a reference numeral 1500 is newly assigned to the band-width variable filter. The band-width variable filter 1500 constitutes a so-called filter bank, and an input switching switch 1501 is provided at the input side of n filters 1 to n different in pass characteristic while an output switching switch 1502 is provided at the output side of the n filters. The switching switches 1501, 1502 are supplied with the control signal as the reception band control signal in FIGS. 12 and 13, whereby the switching operation thereof is controlled.

Figure 16A:
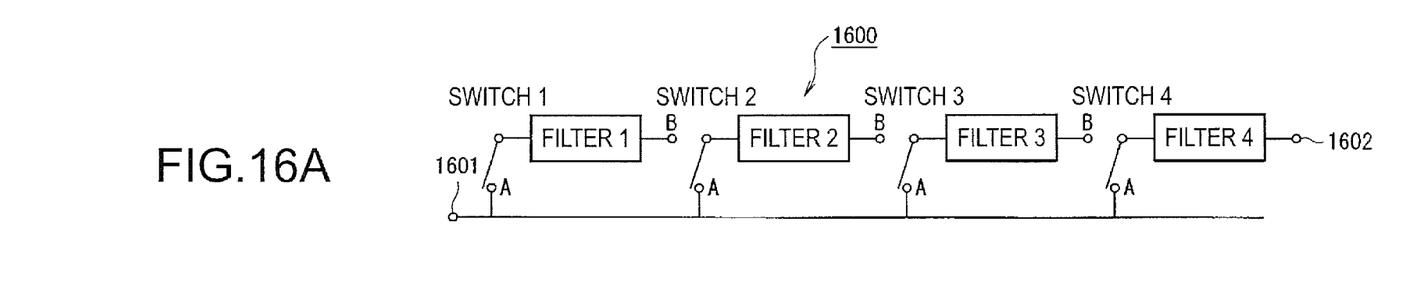
FIG. 16 is a diagram showing another construction of the bandwidth-variable reception filter in FIGS. 12 and 13.
Figure 16B:
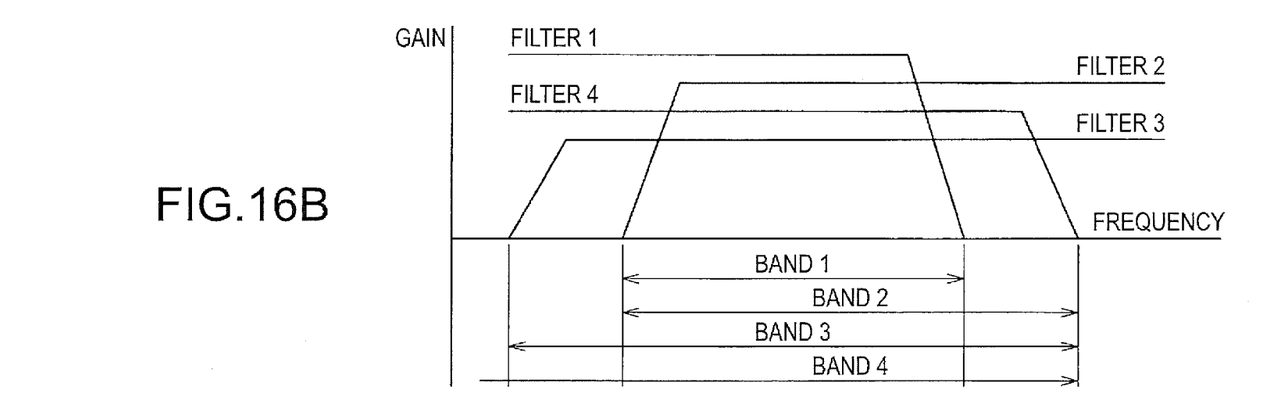
Figure 16C:
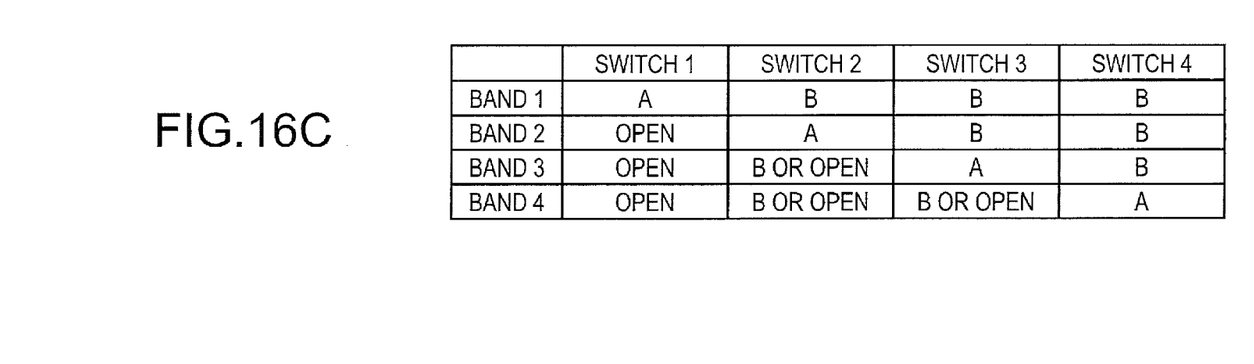

FIGS. 16A to 16C are diagrams showing another construction of the band-width variable BPFs 1220 and 1320 in FIGS. 12 and 13. In FIGS. 16A to 16C, a reference numeral 1600 is newly assigned to the band-width variable filter. The band-width variable filter 1600 constitutes a so-called filter bank, and the circuit construction is shown in FIG. 16A. That is, totally four filters of two low pass filters (filter 1 and filter 4) different in pass characteristic and two high pass filters (filter 2 and filter 3) are provided, and respective switching switches (switch 1, switch 2, switch 3 and switch 4) are successively interposed between the respective filters in this order, whereby the in-series connection state of these filters is switched by the four switches.

The characteristics of the filters 1 and 4 as the low pass filters and the filters 2 and 3 as the high pass filters are shown in FIG. 16B, and when the four switches described above are switched as shown in a table of FIG. 16C, the characteristics represented by bands 1 to 4 in the table are obtained as shown in FIG. 16B.

The switching of the switches 1, 2, 3 and 4 is carried out by supplying substantially the same control signal as the reception band control signal from the reception filter band adjusting function parts 1219, 1319 in the system controllers 1210, 1310 of FIGS. 12 and 13 to the control signal input terminals of these switches, respectively.

The technical idea of the invention described above with reference to the drawings may be applied as a receiving method characterized by adaptively adjusting the pulse number of a template pulse used to detect the reception pulse in the pulse communication.

According to this receiving method, even in the synchronization capture at the initial stage of the communication, the optimum pulse number is set at this stage and rapid synchronization capture is implemented, so that the power consumption associated with the reception can be reduced. Furthermore, even when pulse signals different in transmission pulse width are received, these pulse signals can be surely detected.

Furthermore, according to the technical idea of the invention, the pulse number of the template pulse used to detect the reception pulse is adaptively adjusted, and thus there are implemented the receiver and the receiving method that are excellent adapted to the new communication method of adjusting the transmission pulse width in the pulse communication proposed by this applicant while sufficiently and actively using the feature of the pulse communication, particularly UWB communication.

The entire disclosure of Japanese Patent Application Nos. 2007-059580, filed Mar. 9, 2007 and 2008-004033, filed Jan. 11, 2008 are expressly incorporated by reference herein.

What is claimed is:

1. A receiver comprising:
    a reception signal detecting circuit that detects whether reception of a reception signal in which data to be received is superposed on pulses of q (q represents an integer from 1 to p) out of pulses from 1 to p (p represents any integer of 2 or more) is started;
    a pulse number adjusting circuit that outputs a pulse number signal representing "r" (r pulses) (r represents an integer from 1 to p) out of the pulses from 1 to p when the reception signal detecting circuit starts the reception of the reception signal;
    a template generating circuit that generates substantially the same template as the r pulses represented by the pulse number signal out of the templates from the template having substantially the same waveform as the one pulse to the template having the same waveform as the p pulses when an input of the pulse number signal is received; and a correlation judging circuit that judges the correlation degree between the q pulses in the reception signal and the generated substantially same template as the r pulses, wherein the correlation judging circuit recognizes that the synchronization of the reception signal has been enabled to be captured when it is judged that the correlation degree is large, and when the correlation judging circuit judges that the correlation degree is small, the pulse number adjusting circuit outputs a pulse number signal representing "s" (s pulses) (s represents an integer from 1 to p that is different from r) out of the pulses from 1 to p in place of the r pulses, and the template generating circuit generates substantially the same template as the s pulses.

2. The receiver according to claim 1, wherein the correlation judging circuit further contains a storage circuit that stores the s pulses when it is judged that the correlation degree between the q pulses in the reception signal and the s pulses in the generated template is large, and when the reception signal detecting circuit judges that reception of a different reception signal is started after the reception signal, the pulse number adjusting circuit outputs a pulse number signal representing "s" (s pulses) stored in the storage circuit in place of the output of the pulse number signal representing the r pulses.

3. The receiver according to claim 1, wherein the pulses are based on a UWB (Ultra Wide Band) communication system.

4. A receiving method comprising:

a reception signal detecting step that detects whether reception of a reception signal in which data to be received is superposed on pulses of q (q represents an integer from 1 to p) out of pulses from 1 to p (p represents any integer of 2 or more) is started;

a pulse number adjusting step that outputs a pulse number signal representing "r" (r pulses) (r represents an integer from 1 to p) out of the pulses from 1 to p when the reception signal detecting step starts the reception of the reception signal;

a template generating step that generates substantially the same template as the r pulses represented by the pulse number signal out of the templates from the template having substantially the same waveform as the one pulse to the template having the same waveform as the p pulses when an input of the pulse number signal is received; and a correlation judging step that judges the correlation degree between the q pulses in the reception signal and the generated substantially same template as the r pulses, wherein the correlation judging step recognizes that the synchronization of the reception signal has been enabled to be captured when it is judged that the correlation degree is large, and when the correlation judging step judges that the correlation degree is small, the pulse number adjusting step outputs a pulse number signal representing "s" (s pulses) (s represents an integer from 1 to p that is different than r) out of the pulses from 1 to p in place of the r pulses, and the template generating step generates substantially the same template as the s pulses.

\* \* \* \* \*